(12) United States Patent
Tashiro et al.

(10) Patent No.: US 8,403,403 B2
(45) Date of Patent: Mar. 26, 2013

(54) FRONT VEHICLE-BODY STRUCTURE OF VEHICLE

(75) Inventors: Kuniyoshi Tashiro, Hiroshima (JP); Nobuyuki Nakayama, Hiroshima (JP); Yamato Matsuda, Hiroshima (JP); Hirofumi Miyamoto, Hiroshima (JP); Hiroshi Sogabe, Hiroshima (JP); Masatoki Kito, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 13/186,751

(22) Filed: Jul. 20, 2011

(65) Prior Publication Data

US 2012/0019027 A1 Jan. 26, 2012

(30) Foreign Application Priority Data

Jul. 20, 2010 (JP) ................................. 2010-162692

(51) Int. Cl.
*B60J 7/00* (2006.01)
(52) U.S. Cl. ............. 296/187.09; 296/193.09; 180/68.4; 293/117

(58) Field of Classification Search .................. 293/117; 296/187.09, 193.09, 193.1; 180/68.4
See application file for complete search history.

(56) References Cited

U.S. PATENT DOCUMENTS 7,438,348 B2 * 10/2008 Nakamae et al. ........ 296/187.04

FOREIGN PATENT DOCUMENTS

JP 2009-073309 A 4/2009

* cited by examiner

*Primary Examiner* — Joseph Pape
(74) *Attorney, Agent, or Firm* — Studebaker & Brackett PC; Donald R. Studebaker (57) ABSTRACT

A pair of sub frames is provided on the outside of a heat exchanger in a vehicle width direction, there is provided a stiffener which interconnects front ends of the sub frames and projects forward, and the stiffener is connected to lower portions of the sub frames. Accordingly, the sufficient attachment rigidity of the stiffener can be secured in the normal state, whereas in the vehicle collision state the stiffener can be easily separated off the sub frames without resisting improperly, so that the safety of pedestrian can be secured.

7 Claims, 9 Drawing Sheets

FRONT VEHICLE-BODY STRUCTURE OF VEHICLE

BACKGROUND OF THE INVENTION

The present invention relates to a front vehicle-body structure of a vehicle which comprises a stiffener for sweeping legs of a pedestrian away so as to move the pedestrian onto a hood (bonnet) of the vehicle in case the vehicle collides with the pedestrian at its front portion.

Conventionally, the above-described stiffener for sweeping pedestrian's legs away is provided between a pair of front side frames extending in a vehicle longitudinal direction at both sides of an engine room, having its width in a vehicle width direction which is substantially equal to the width of a radiator shroud. Accordingly, if this stiffener was connected only to the radiator shroud, the sufficient attachment rigidity could be secured. In these days, however, it has been desired that the above-described stiffener is arranged widely over an entire width range of the above-described pair of front side frames being provided as a vehicle-body rigidity member.

In this case, it may be necessary to arrange the stiffener over the width of a front bumper arranged at the front portion of the vehicle so as to extend outward beyond the shroud panel in the vehicle width direction. Therefore, only the connection of the stiffener to the radiator shroud described above could not provide the sufficient attachment rigidity. Further, it has been desired that the stiffener can provide the sufficient attachment rigidity in a normal state, and also in the state of vehicle's colliding with any pedestrian the stiffener can be easily separated off or broken without resisting improperly so as to secure the safety of pedestrian.

Meanwhile, Japanese Patent Laid-Open Publication No. 2009-73309 discloses a structure in which the stiffener for sweeping pedestrian's legs away is arranged widely so as to extend outward beyond a heat exchanger in the vehicle width direction, and this stiffener is attached to crush cans provided at front ends of the sub frames. This structure, however, has a problem in that since the connection of the stiffener to the crush cans is non-detachable, the stiffener would resist improperly in the vehicle collision with the pedestrian.

SUMMARY OF THE INVENTION

An object of the present invention is to provide a front vehicle-body structure of a vehicle in which the sufficient attachment rigidity of the stiffener can be secured in the normal state, whereas in the vehicle collision state the stiffener can be easily separated off the sub frames without resisting improperly, so that the safety of pedestrian can be secured.

According to the present invention, there is provided a front vehicle-body structure of a vehicle, comprising a pair of front side frames extending in a longitudinal direction at both sides of a front portion of the vehicle, a pair of sub frames provided below the front side frames and supporting a front suspension, a heat exchanger provided between the pair of front side frames, a stiffener interconnecting front ends of the pair of sub frames and projecting forward, wherein the sub frames are provided on the outside of the heat exchanger in a vehicle width direction, and the stiffener is connected to lower portions of the sub frames so as to be separated off the sub frames downward by a collision load in a vehicle collision state.

According to the present invention, since outside portions of the stiffener are connected to the lower portions of the sub frames, the sufficient attachment rigidity of the stiffener can be secured in the normal state. In the vehicle collision state, meanwhile, the stiffener can be easily separated off the sub frames without resisting improperly, so that the safety of pedestrian can be secured. Further, since the stiffener is separated downward by the collision load when the vehicle collides lightly against any obstacle, a transmitting force of the collision load to the sub frames is reduced so that deformation of the sub frame can be restrained.

According to another embodiment of the present invention, crush cans are attached to front ends of the front side frames, a bumper reinforcement is provided at front portions of the crush cans to extend in the vehicle width direction, and the stiffener projects forward to a position near a back face of a bumper face provided in front of the bumper reinforcement. Thereby, since the stiffener is separated downward by the collision load when the vehicle collides against any obstacle, the collision load may not improperly influence the impact energy absorption mode of the bumper reinforcement and crush cans, so that the appropriate impact energy absorption mode of the bumper reinforcement and crush cans can be provided.

According to an embodiment of the present invention, the heat exchanger comprises a shroud panel covering a radiator, and the stiffener has a contact face to contact a front face of the shroud panel in a vehicle frontal collision and is connected to the shroud panel. Thereby, since the stiffener has the above-described contact face, the stiffener and the shroud panel contact each other through a face contact, so that the collision load inputted to the stiffener can be received at the shroud panel.

According to another embodiment of the present invention, the stiffener provided between the pair of sub frames is connected to a lower portion of a shroud panel covering a radiator. Thereby, since a connection portion of the stiffener is the lower portion of the shroud panel, the attachment rigidity of the stiffener can be secured in the normal state, and also the stiffener can be easily separated off the shroud panel without resisting improperly in the vehicle frontal collision state, so that the safety of pedestrian can be secured.

According to another embodiment of the present invention, the stiffener comprises a notch portion, through which an intake duct to supply air for combustion of an engine passes, to avoid interference with the intake duct. Thereby, both disposition of the stiffener and layout of the intake duct can be provided properly.

According to another embodiment of the present invention, the stiffener comprises an extension portion extending outward beyond the shroud panel in the vehicle width direction, and the extension portion has a support portion to support a bumper face. Thereby, the bumper face can be securely supported over its almost-entire range in the vehicle width direction by utilizing the above-described extension portion of the stiffener.

According to another embodiment of the present invention, the stiffener is provided via an attachment portion attached to a front end of the sub frame. Herein, the attachment portion may be comprised of a crush can provided at the front end of the sun frame. Thereby, since the stiffener is provided via the attachment portion, in case the stiffener is damaged, there may be no need to replace the sub frame itself, but only replacement of the attachment portion and the stiffener may be required. Further, it may be possible to easily correspond to a design change due to the kind of vehicles.

Other features, aspects, and advantages of the present invention will become apparent from the following description which refers to the accompanying drawings.

DETAILED DESCRIPTION OF THE INVENTION

Figure 1:
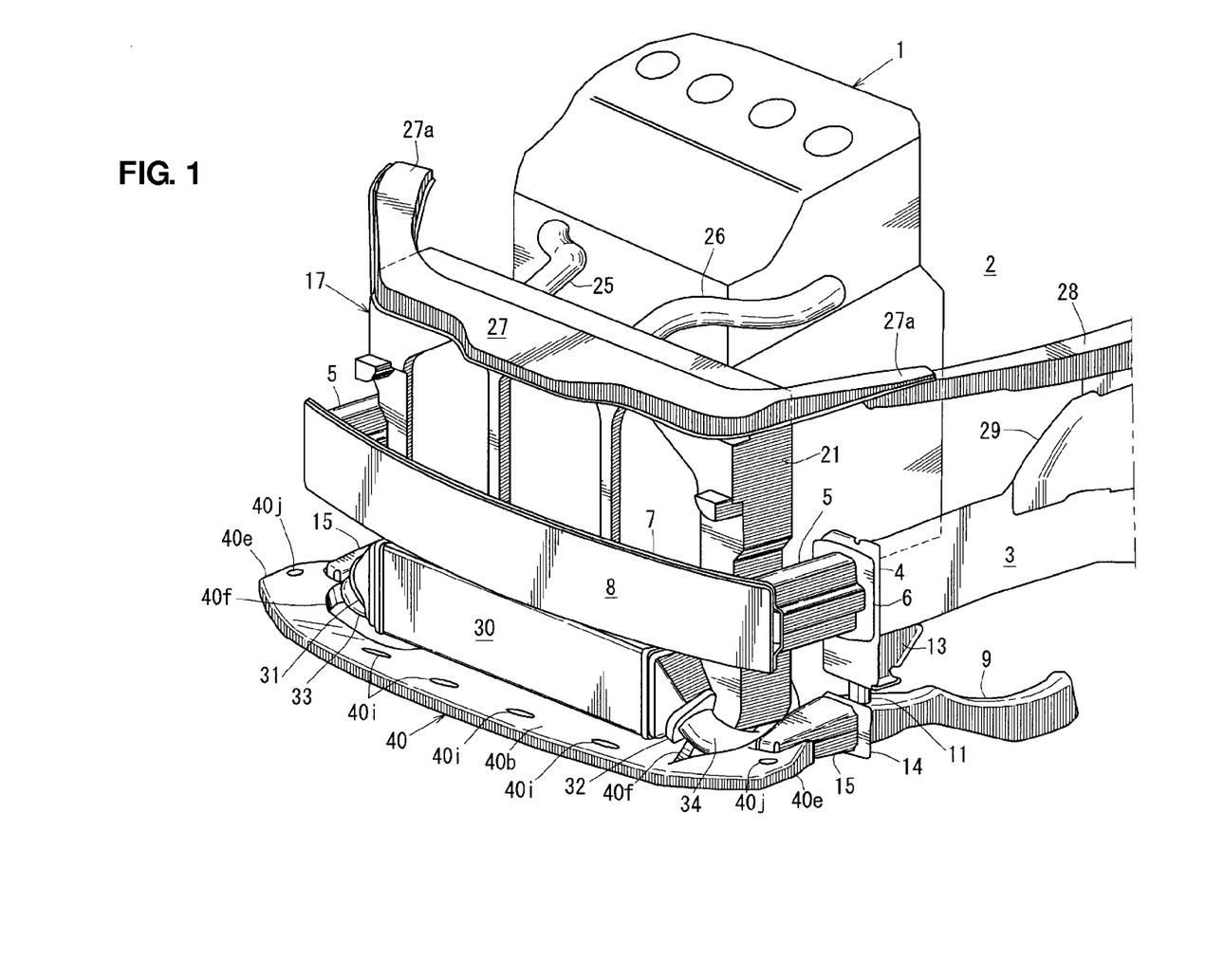
FIG. 1 is a perspective view showing a front vehicle-body structure of a vehicle of the present invention.
Figure 2:
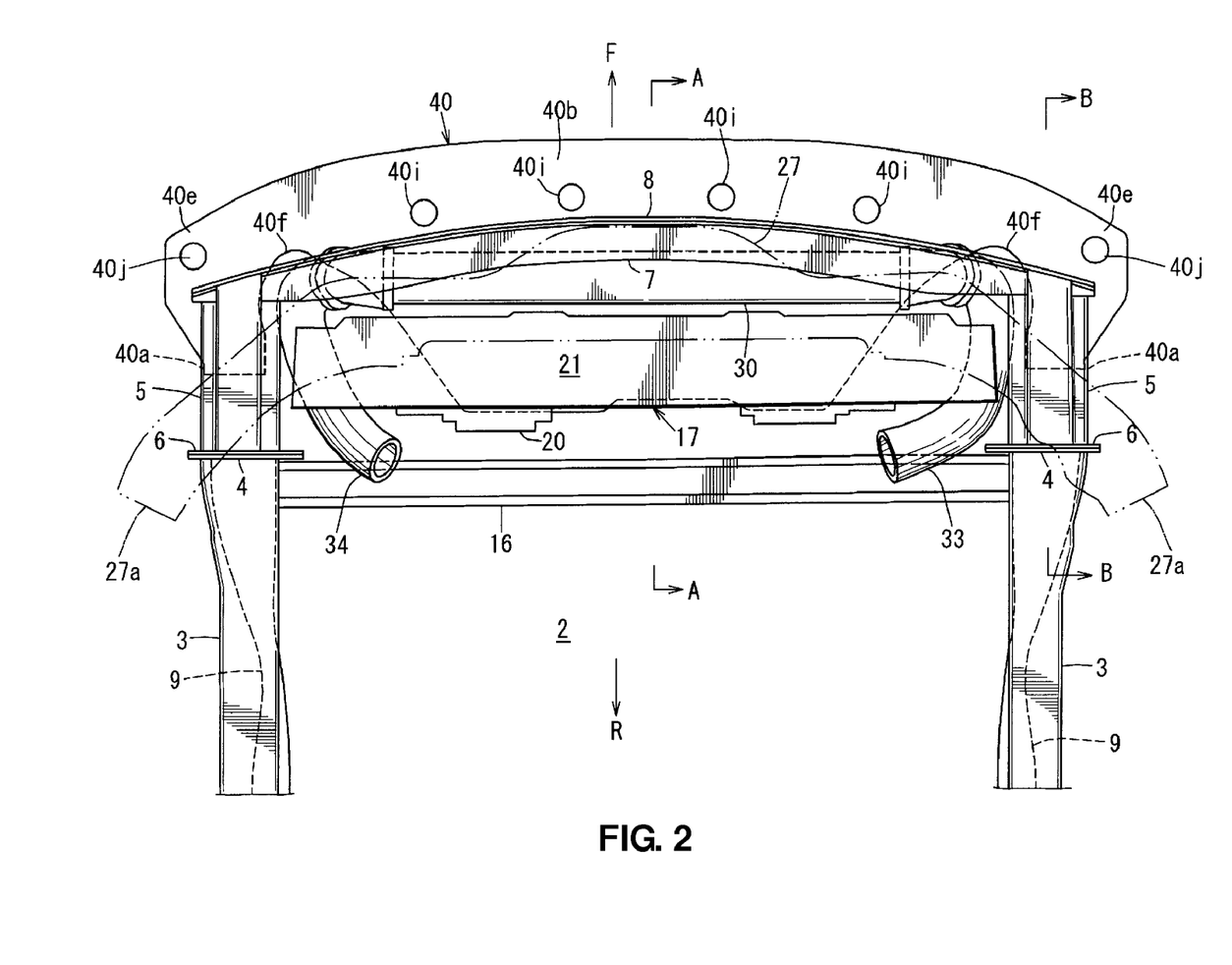
FIG. 2 is a plan view of a major portion of FIG. 1.
Figure 3:
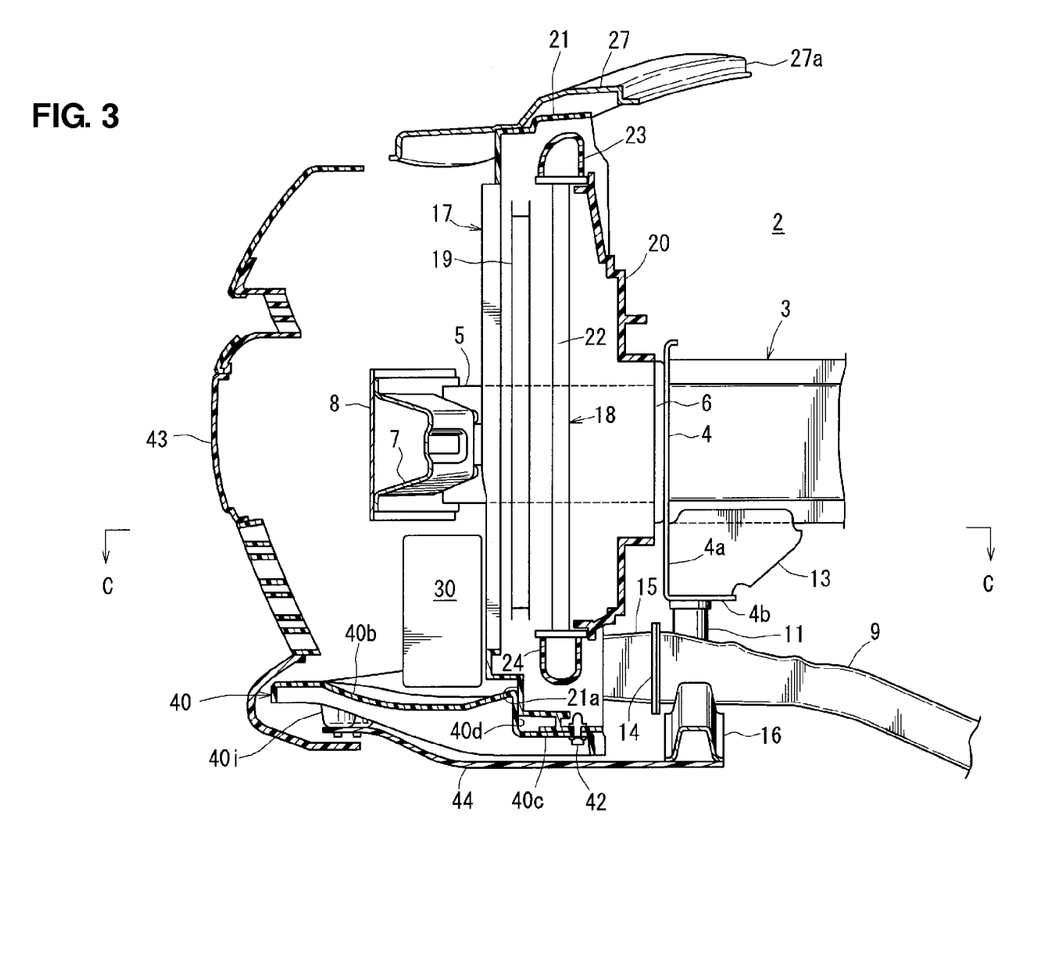
FIG. 3 is a sectional view taken along line A-A of FIG. 2.
Figure 4:
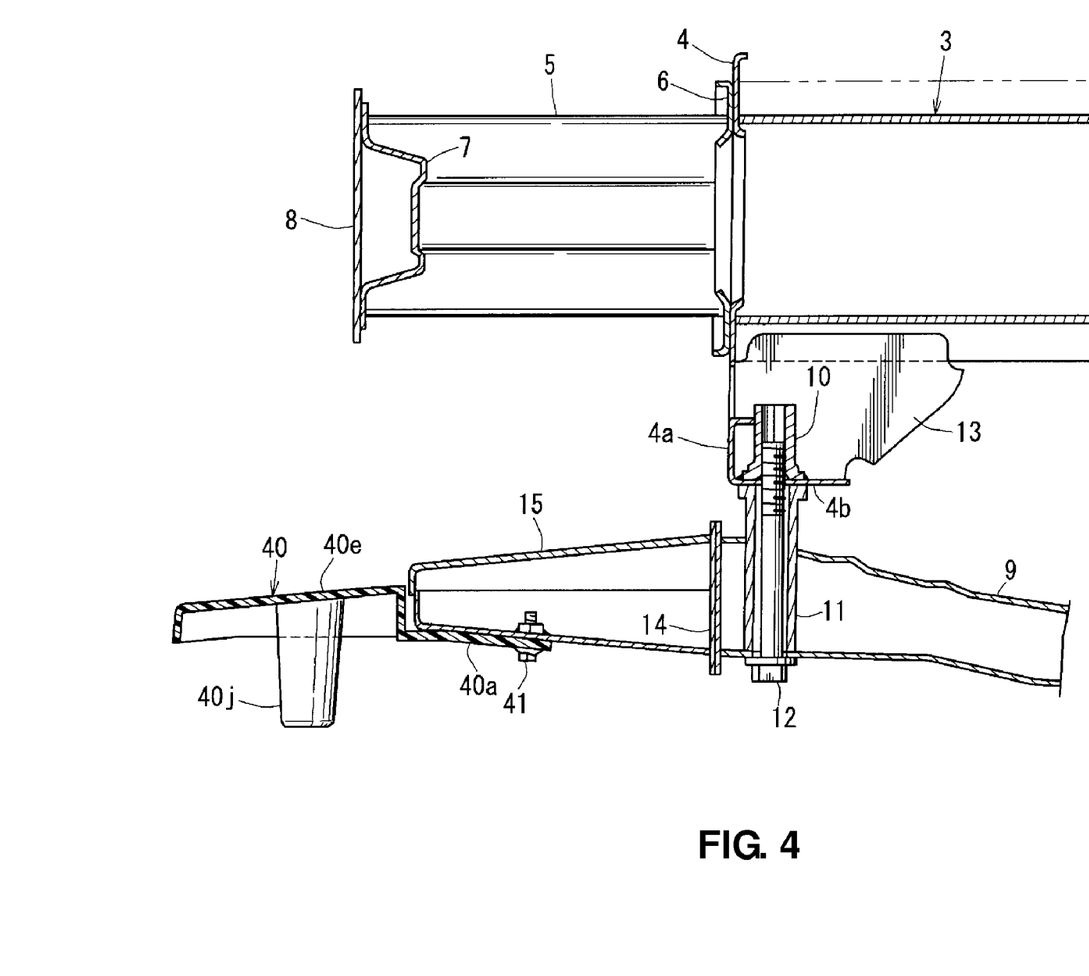
FIG. 4 is a sectional view taken along line B-B of FIG. 2.

Hereinafter, a preferred embodiment of the present invention will be descried referring to the accompanying drawings. The drawings illustrate a front vehicle-body structure of a vehicle. FIG. 1 is a perspective view showing the front vehicle-body structure of a vehicle of the present invention, FIG. 2 is a plan view of a major portion of FIG. 1, FIG. 3 is a sectional view taken along line A-A of FIG. 2, and FIG. 4 is a sectional view taken along line B-B of FIG. 2. In the figures, an arrow F denotes the forward direction of the vehicle, and an arrow R denotes the rearward direction of the vehicle.

In FIGS. 1 through 4, there is provided a pair of front side frames 3, 3 which extends in a longitudinal direction of the vehicle at both sides of an engine room 2 storing an engine 1. The front side frame 3 is a vehicle-body rigidity member, which comprises a front-side frame inner and a front-side frame outer which are joined to each other, and has a front-side closed cross section extending in the vehicle longitudinal direction.

To a front end of the front side frame 3 is attached a crush can 5 via a flange 4 on the side of front side frame 3 and a flange 6 on the side of the crush can 5. A bumper reinforcement (specifically, a bumper reinforcement) 7 extends in a vehicle width direction and interconnects front ends of a pair of crush cans 5, 5 (an impact energy absorbing member). The bumper reinforcement 7 is formed so as to have a U-shaped cross section with an opening portion which opens in the forward direction of the vehicle. A closing plate 8 is attached to a front portion of the bumper reinforcement 7 so as to cover the opening portion of the bumper reinforcement 7 therewith, so that a closed cross section extending in the vehicle with direction is formed between the bumper reinforcement 7 and the closing plate 8.

A pair of sub frames 9, 9 to support a front suspension (not illustrated) is arranged below the pair of front side frames 3, 3.

As shown in FIG. 4, the flange 4 at the front end of the front side frame 3 includes an extension portion 4a extending downward and an attachment base 4b extending rearward from the extension portion 4a. A nut member 10 is welded to an upper face of the attachment base 4b.

Further, as shown in this figure, a cylindrical member 11 which penetrates the sub frame 9 is provided, and in a state in which an upper end of the cylindrical member 11 contacts a lower face of the attachment base 4b, a long bolt 12 is inserted into the inside hole of the cylindrical member 11, and then the nut member 10 is fastened to the bolt 12. Thereby, the sub frame 9 is attached below the front side frame 3. Moreover, as shown in FIG. 4, a bracket 13 is fixed between the extension portion 4a and the attachment base 4b of the flange 4 and the front side frame 3. Thereby, the attachment strength of the sub frame 9 is improved.

A pair of crush cans 15 (an impact energy absorbing member) as an attachment portion is attached to front end portions of the pair of sub frames 9 via flanges 14. Further, as shown in FIGS. 2 and 3, the both sub frames 9, 9 are interconnected by a cross member 16 having a U-shaped cross section in the vehicle width direction right behind the above-described flange 14.

Figure 5:
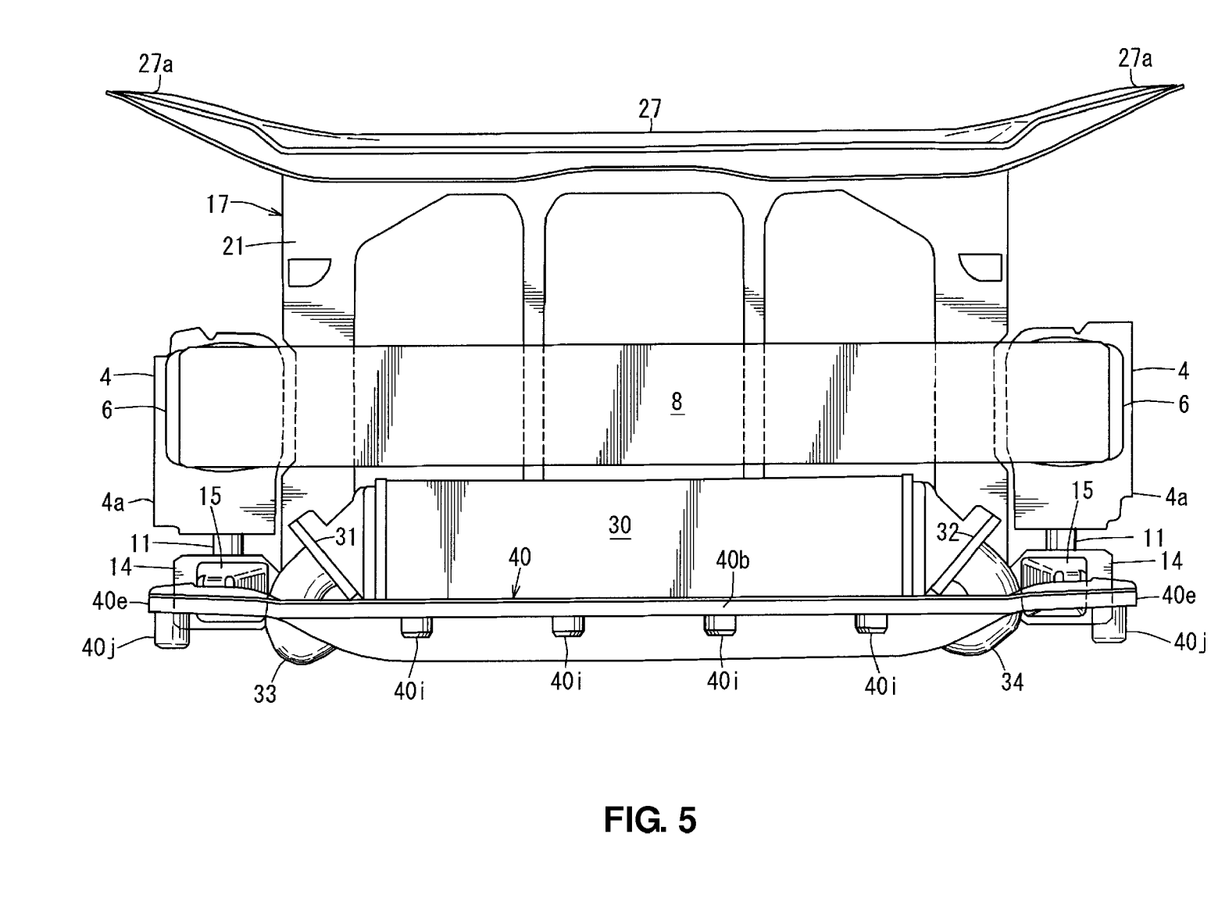
FIG. 5 is an elevational view showing the front vehicle-body structure of a vehicle.
Figure 6:
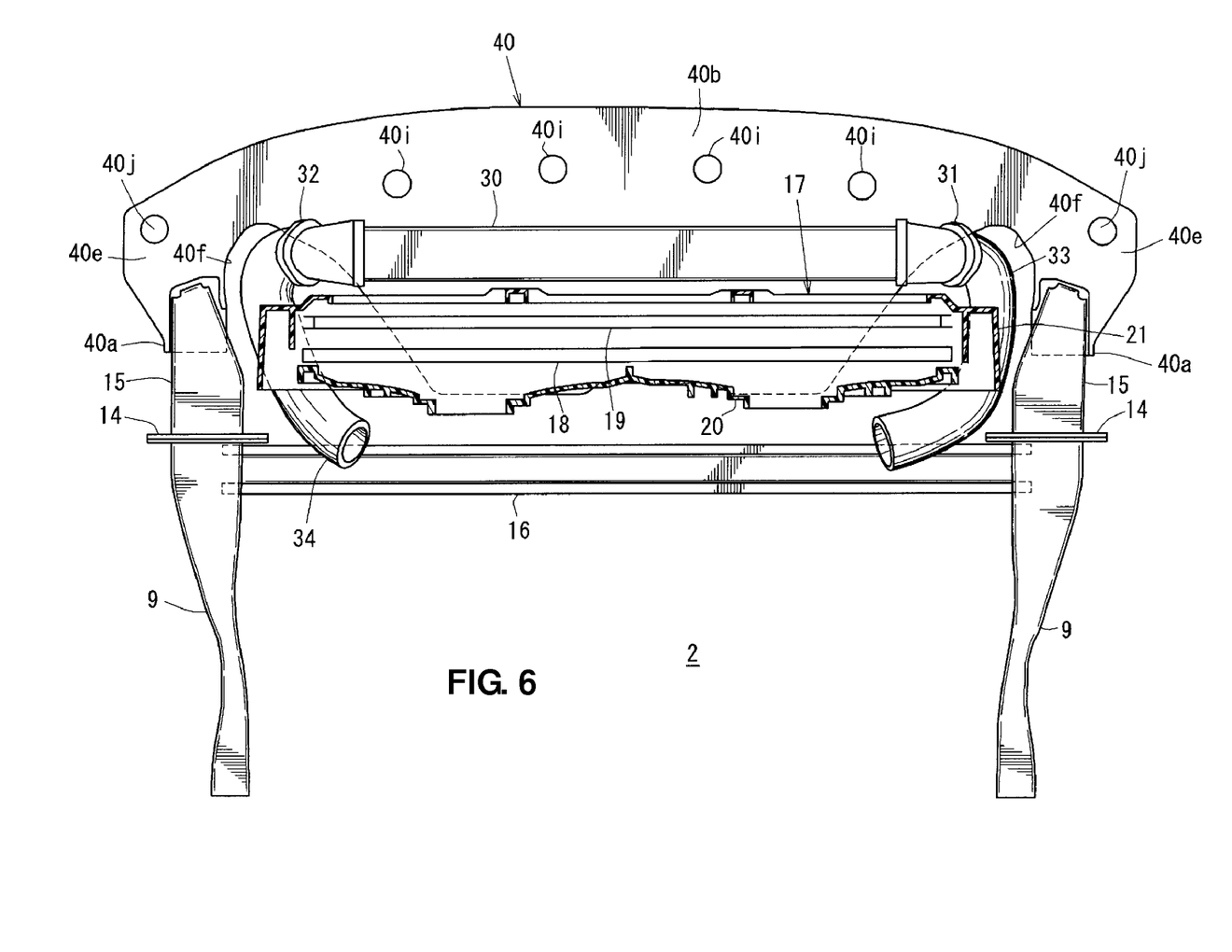
FIG. 6 is a sectional view taken along line C-C of FIG. 3.

FIG. 5 is an elevational view showing the front vehicle-body structure of a vehicle, and FIG. 6 is a sectional view taken along line C-C of FIG. 3. As shown in FIGS. 3, 5 and 6, a heat exchanger 17 is arranged between the pair of front side frames 3, 3.

The heat exchanger 17 comprises a radiator 18 to cool an engine coolant (cooling water) with air, a condenser 19 for air conditioning, a radiator cowling 20 covering a cooling fan (not illustrated), and a synthetic-resin made shroud panel 21 covering the radiator 18 and the condenser 19.

The radiator 18, as shown in FIG. 3, comprises a core portion 22 including water tubes and fins, an upper tank 23 provided integrally with an upper portion of the core portion 22, and a lower tank 24 provided integrally with a lower portion of the core portion 22. As shown in FIG. 1, an inlet hose 25 connects a water jacket of the engine 1 and the upper tank 23, and an outlet hose 26 connects the lower tank 24 and the water jacket of the engine 1.

As shown in FIGS. 1 and 3, a shroud upper 27 extending in the vehicle width direction is provided above the heat exchanger 17, and its both side ends bend rearward so as to correspond to the vehicle design. Each rear end portion 27a of the shroud upper 27 is fixed to an apron reinforcement 28 as shown in FIG. 1.

Further, as shown in FIG. 1, a wheel house inner 29 is attached between the apron reinforcement 28 and the front side frame outer of the front side frame 3. As shown in FIGS. 2 and 3, an intercooler 30 is arranged right before the heat exchanger 17 and below the bumper reinforcement 7.

The intercooler 30, which cools the induct air heated by a compressor of a supercharger to increase the intake-air charge efficiency of the engine, has an upstream-side flange 31 and a downstream-side flange 32 which are formed integrally with its both side portions. An upstream-side intake duct 33 to connect a compressor chamber and the intercooler 30 of the supercharger is attached to the upstream-side flange 31. A downstream-side intake duct 34 to supply the air cooled by the intercooler 30 to intake ports of a cylinder head of the engine 1 is attached to the downstream-side flange 32. That is, the respective intake ducts 33, 34 are intake pipes to supply the air for combustion of the engine 1.

As shown in FIGS. 2 and 6, the pair of sub frames 9, 9 is provided below the pair of front side frames 3, 3 on the outside of the heat exchanger 17 in the vehicle width direction, and there is provided the synthetic-resin made stiffener 40 which interconnects the front ends of the pair of sub frames 9, 9 or the both-side crush cans 15, 15 and projects forward. This stiffener 40 is a member which can sweep the pedestrian's legs away so as to move the pedestrian onto the hood (bonnet) of the vehicle in case the vehicle collides with the pedestrian, thereby can secure the safety of the pedestrian.

Figure 7:
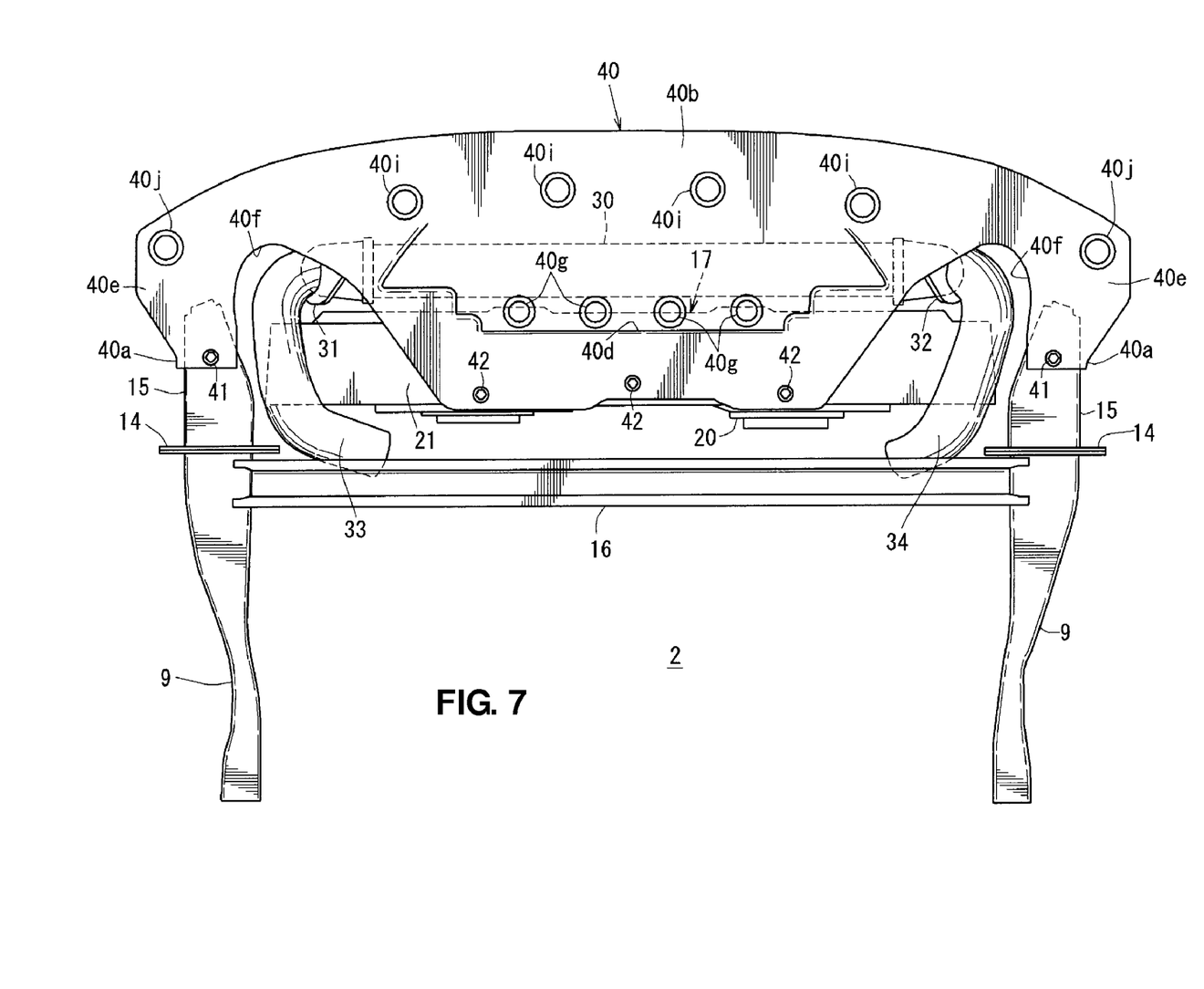
FIG. 7 is a bottom view of FIG. 6.

FIG. 7 is a bottom view of FIG. 6. As shown in FIGS. 6 and 7, both-side rear portions 40a, 40a of the stiffener 40 are connected to lower portions of the sub frames 9, specifically to lower portions of the crush cans 15 at the front end portions of the sub frames 9.

As the cross section of the connection portion is shown in FIG. 4, the rear portion 40a of the stiffener 40 is attached to a lower face of the crush can 15 from below with an attaching member 41, such as bolt, nut, clip or fastener.

Figure 8:
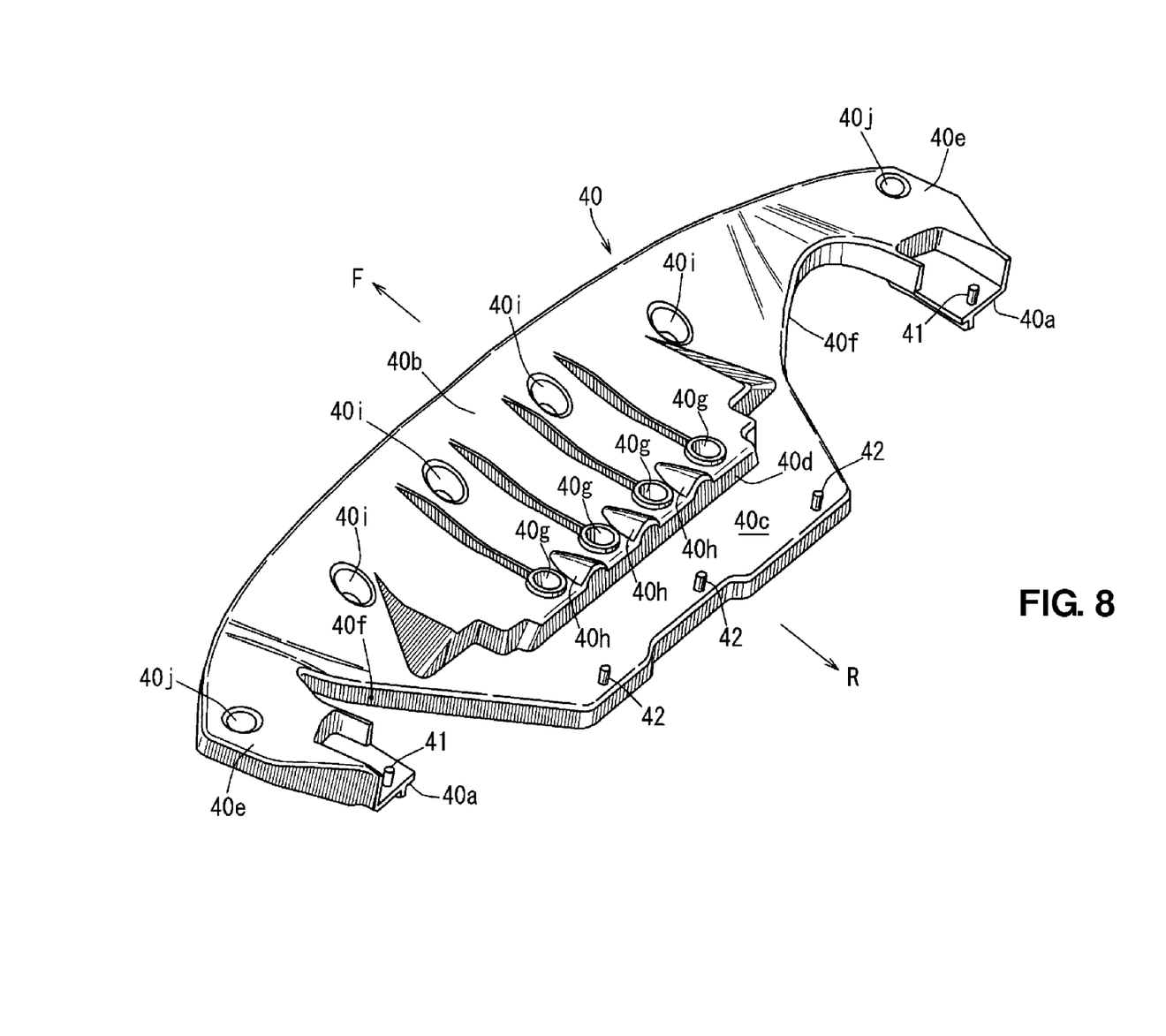
FIG. 8 is a perspective view of a stiffener.

FIG. 8 is a perspective view showing the stiffener 40. As shown in FIGS. 1-8, the stiffener 40 projects forward beyond the bumper reinforcement 7 and extends in the vehicle width direction over the substantially entire width. The stiffener 40 comprises a main-body portion 40b which is positioned at the center in the vehicle width direction, a main-body rear portion 40c which is positioned behind the main-body portion 40b, a contact face 40d which is formed in a step shape between the main-body portion 40b and the main-body rear portion 40c, right and left extension portions 40e, 40e which extend outward beyond the shroud panel 21 in the vehicle width direction, right and left notch portions 40f, 40f which are formed between the extension portions 40e and the main-body portion 40b and the main-body rear portion 40c, respectively, and through which the above-described intake ducts 33, 34 pass to avoid interference with the intake ducts 33, 34, and the above-described both-side rear portions 40a, 40a.

The above-described heat exchanger 17 is equipped with the shroud panel 21 covering the radiator 18 and the condenser 19 as described above, the above-described stiffener 40, as shown in FIG. 3, has the contact face 40d which contacts the front face 21a of the shroud panel 21 in the case of the vehicle frontal collision, and the main-body rear portion 40c of the stiffener 40 are connected to a lower portion of the shroud panel 21 from below with plural clips 42 (see FIGS. 3 and 8). Further, the stiffener 40 projects forward such that its front end portion is located near a back face of a bumper face 43, which will be described below, as shown in FIG. 3.

Further, as shown in FIGS. 2, 6 and 7, the above-described intake ducts 33, 34 are arranged by using the both-side notch portions 40f, 40f of the stiffener 40, so that both the disposition of the stiffener 40 and the layout of the intake ducts 33, 34 can be provided properly.

Moreover, as shown in FIG. 8, plural opening portions 40g . . . are formed at a portion right before the contact face 40d of the stiffener, having specified intervals in the vehicle width direction. The air heated by the intercooler 30 can be discharged downward through these opening portions 40g . . . . Further, between the adjacent opening portions 40g, 40g are formed bead portions 40h . . . which project upward, and rear faces of these bead portions 40h are positioned to form a flat face together with the above-described contact face 40d so that the area of the contact face 40d can be properly enlarged by the rear faces of the bead portions 40h.

Meanwhile, as shown in FIG. 3, the bumper face 43 which constitutes an outer fascia of the front bumper is attached in front of the bumper reinforcement 7, whereas an under cover 44 is attached below the stiffener 40 and the cross member 16. Herein, plural under-cover support potions 40i which project downward from the main-body portion 40b are integrally formed with the main-body portion 40b of the stiffener as shown in FIGS. 5 and 8. The plural under-cover support portions 40i are formed at the main-body portion 40b, having specified intervals in the vehicle width direction.

The above-described right and left extension portions 40e, 40e of the stiffener 40 integrally have bumper-face support portions 40j, 40j which support a lower portion of the bumper face 43. These support portions 40j, 40j project downward from the extension portions 40e.

The above-described stiffener 40, as shown in FIG. 4, is arranged via the crush cans 15 as the attachment portion attached to the front ends of the sub frames 9, so that when the stiffener 40 is damaged or broken, it may not be necessary to replace the sub frames 9, but only the crush cans 15 and the stiffener 40 may be replaced properly. Accordingly, the maintenance may be improved.

Hereinafter, the operation of the embodiment described above will be described. Since the above-described stiffener 40 is connected to the crush cans 15 from below at its both sides via the two attaching members 41, 41 shown in FIG. 8 and the main-body rear portion 40c is connected to the shroud panel 21 from below via the plural clips 42 (three clips in the present embodiment) shown in this figure, the sufficient attachment rigidity of the stiffener 40 can be secured in the normal state even with the wide structure of the stiffener 40 extending outward beyond the heat exchanger 17.

Figure 9:
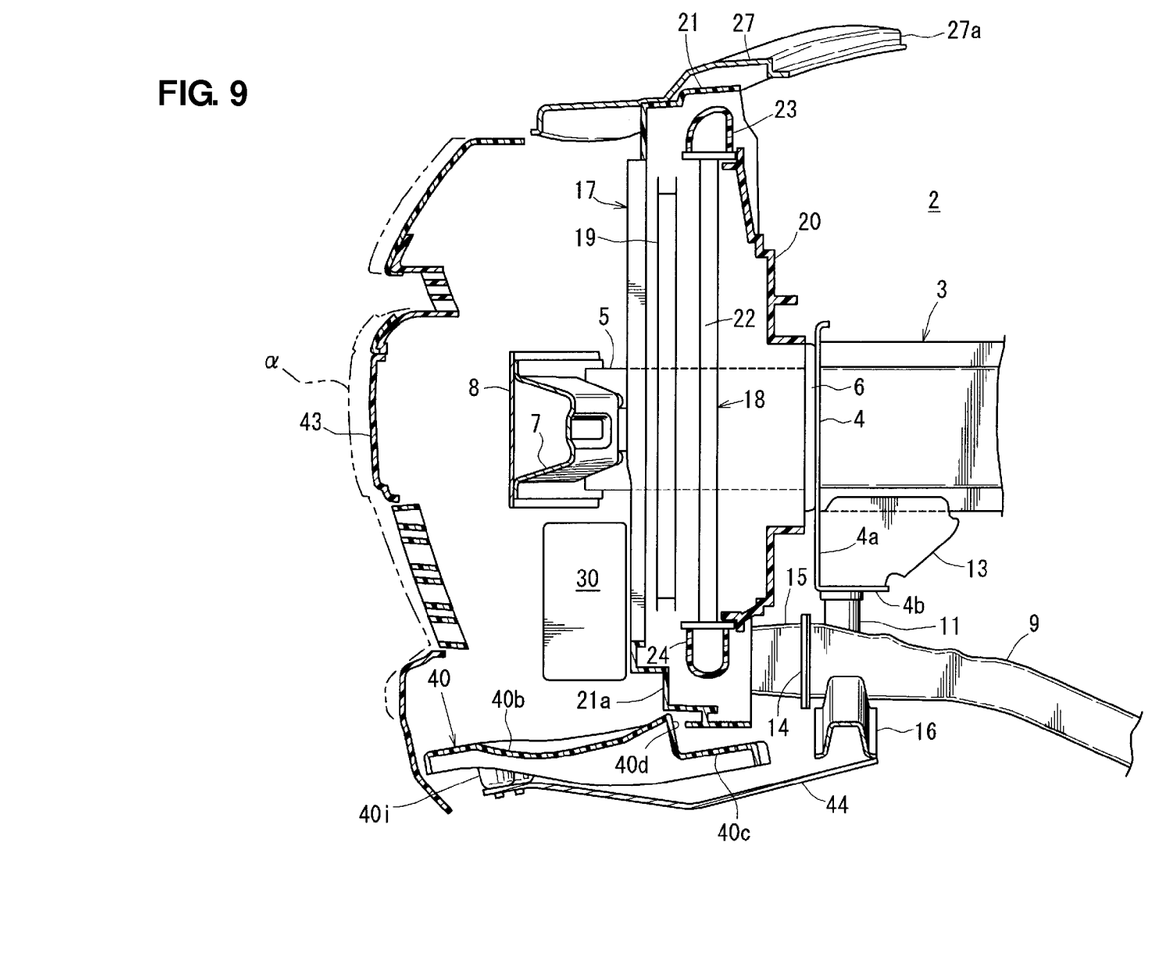
FIG. 9 is an explanatory view showing a vehicle collision state.

Meanwhile, in the case of the vehicle collision with the pedestrian, the stiffener 40 sweeps the pedestrian's legs away so as to move the pedestrian onto the hood (bonnet) of the vehicle. In this case, connection portions of the stiffener 40 to the attaching members 41 and the clips 42 are broken, the contact face 40d disengages from the front face 21a of the shroud panel 21, and the stiffener 40 is downward separated off the lower faces of the crush cans 15 at the front ends of the sub frames 9 and the shroud panel 21 as shown in FIG. 9, so that the stiffener 40 may not resist improperly and thereby the safety of pedestrian can be secured. In FIG. 9, a phantom line a illustrates the position of the bumper face 43 in the case of vehicle non-collision (the normal state).

As described above, the front vehicle-body structure of a vehicle of the present embodiment comprises a pair of front side frames 3, 3 extending in the longitudinal direction at the both sides of the front portion of the vehicle, a pair of sub frames 9, 9 provided below the front side frames 3, 3 and supporting the front suspension, the heat exchanger 17 provided between the pair of front side frames 3, 3, the stiffener 40 interconnecting the front ends of the pair of sub frames 9, 9 and projecting forward, wherein the sub frames 9 are provided on the outside of the heat exchanger 17 in the vehicle width direction, and the stiffener 40 is connected to the lower portions of the sub frames 9 (see FIGS. 2 and 3).

According to this structure, since outside portions of the stiffener 40 are connected to the lower portions of the sub frames 9, the sufficient attachment rigidity of the stiffener 40 can be secured in the normal state. In the vehicle collision state, meanwhile, the stiffener 40 can be easily separated off the sub frames 9 without resisting improperly, so that the safety of pedestrian can be secured. Further, since the stiffener 40 is separated off the crush cans 15 at the font end of the sub frames 9 and the lower face of the shroud panel 21 downward by the collision load even when the vehicle collides lightly against any obstacle, a transmitting force of the collision load to the sub frames 9 is reduced so that deformation of the sub frames 9 can be restrained.

Also, since the stiffener 40 is separated off the crush cans 15 at the font end of the sub frames 9 and the lower face of the shroud panel 21 downward by the collision load when the vehicle collides against any obstacle, the collision load may not improperly influence the impact energy absorption mode of the bumper reinforcement 7 and crush cans 5, so that the appropriate impact energy absorption mode of the bumper reinforcement 7 and crush cans 5 can be provided.

Further, the heat exchanger 17 comprises the shroud panel 21 covering the radiator 18, and the stiffener 40 has the contact face to contact the front face of the shroud panel 21 in the vehicle frontal collision and is connected to the shroud panel 21 (see FIG. 3). Thereby, since the stiffener 40 has the above-described contact face 40d, the stiffener 40 and the shroud panel 21 contact each other through the face contract, so that the load inputted to the stiffener 40 can be received at the shroud panel 21.

Moreover, the stiffener 40 provided between the pair of sub frames 9, 9 is connected to the lower portion of the shroud panel 21 covering the radiator 18 (see FIG. 3). Thereby, since the connection portion of the stiffener 40 is the lower portion of the shroud panel 21, the attachment rigidity of the stiffener 40 can be secured in the normal state, and also the stiffener 40 can be easily separated off the shroud panel 21 without resisting improperly in the vehicle frontal collision state, so that the safety of pedestrian can be secured.

Additionally, the stiffener 40 comprises the notch portions 40f, 40f, through which the intake ducts 33, 34 to supply the air for combustion of the engine passes, to avoid interference with the intake ducts 33, 34 (see FIGS. 2 and 8). Thereby, both the disposition of the stiffener 40 and the layout of the intake ducts 33, 34 can be provided properly.

Also, the stiffener 40 comprises the extension portion 40e extending outward beyond the shroud panel 21 in the vehicle width direction, and the extension portion 40e has the support portion (see the bumper-face support portions 40j) to support the bumper face 43 (see FIGS. 3, 5 and 6). Thereby, the bumper face 43 can be securely supported over its almost-entire range in the vehicle width direction by utilizing the above-described extension portions 40e of the stiffener 40.

Further, the stiffener 40 is provided via the attachment portion (see the crush cans 15) attached to the front end of the sub frames 9 (see FIG. 4). Thereby, since the stiffener 40 is provided via the attachment portion (see the crush cans 15), in case the stiffener 40 is damaged, there may be no need to replace the sub frames 9, but only replacement of the attachment portion (see the crush cans 15) and the stiffener 40 may be required. Further, it may be possible to easily correspond to a design change due to the kind of vehicles.

The present invention should not be limited to the above-described embodiment, and any other modifications and improvements may be applied within the scope of a sprit of the present invention.

What is claimed is:

1. A front vehicle-body structure of a vehicle, comprising:
a pair of front side frames extending in a longitudinal direction at both sides of a front portion of the vehicle;
a pair of sub frames provided below the front side frames and supporting a front suspension;
a pair of attachment portions attached to front ends of the pair of sub frames and projecting forward;
a heat exchanger provided between the pair of front side frames, the heat exchanger including a radiator and a shroud panel covering the radiator;
a stiffener extending in a vehicle width direction and projecting forward, the stiffener being positioned below the shroud panel and the pair of attachment portions, the stiffener comprising a main-body portion positioned at a center in the vehicle width direction, a main-body rear portion positioned behind the main-body portion, and both-side portions positioned on both sides of the main-body portion, wherein said sub frames and said attachment portions are provided on the outside of said heat exchanger in the vehicle width direction, and
said stiffener is attached to a lower face of said shroud panel and respective lower faces of said pair of attachment portions via attaching members such that an upper face of the main-body rear portion thereof contacts the lower face of the shroud panel and respective upper faces of the both-side portions thereof contact the respective lower faces of the pair of attachment portions, whereby the stiffener is separated downward off the lower face of said shroud panel and the attachment portions by a collision load in a vehicle collision state.

2. The front vehicle-body structure of a vehicle of claim 1, wherein said attachment portions attached to the front ends of the sub frames are comprised of crush cans, a bumper reinforcement is provided at front portions of said crush cans to extend in the vehicle width direction, and said stiffener projects forward to a position near a back face of a bumper face provided in front of the bumper reinforcement.

3. The front vehicle-body structure of a vehicle of claim 1, wherein said stiffener has a contact face to contact a front face of said shroud panel in a vehicle frontal collision, which is formed in a step shape between the main-body portion and the main-body rear portion.

4. The front vehicle-body structure of a vehicle of claim 1, wherein said stiffener has a notch portion with a rearward open, through which an intake duct to supply air for combustion of an engine passes, to avoid interference with the intake duct, which is formed at a connection potion between the both-side portion and the main-body portion.

5. The front vehicle-body structure of a vehicle of claim 1, wherein each of said both-side portions of the stiffener comprises an extension portion extending outward beyond said shroud panel in the vehicle width direction, and the extension portion has a support portion to support a bumper face.

6. The front vehicle-body structure of a vehicle of claim 1, wherein each of said both-side portions of the stiffener comprises an extension portion which extends outward in the vehicle width direction from said main-body portion, and a rear portion which projects rearward from said extension portion and has an upwardly open recess, at least part of each of said attachment portions being positioned in the recess of the rear portion such that a bottom face of said recess contacts the lower face of said at least part of the attachment portion, thereby attaching the both-side portions of the stiffener to the lower faces of the attachment portions via said attaching member.

7. The front vehicle-body structure of a vehicle of claim 1, wherein said attaching members are fastening members which are applied from below the stiffener.

* * * * *